(12) United States Patent
Ruiters et al.

(10) Patent No.: US 10,696,176 B2
(45) Date of Patent: Jun. 30, 2020

(54) CONTROLLING A DRIVE SYSTEM FOR AT LEAST ONE AXLE OF A MOTOR VEHICLE

(71) Applicant: GKN Automotive Ltd., Redditch, Worcestershire (GB)

(72) Inventors: Volker-René Ruiters, Siegburg (DE); Florian Sontheim, Troisdorf (DE); Rudolf Fitz, Troisdorf (DE); Emanuel Blaj, Bergisch Gladbach (DE); Gerd Kaiser, Lobbach (DE); Enrique Cordero, Köln (DE)

(73) Assignee: GKN Automotive Ltd., Redditch, Worcestershire (GB)

(*) Notice: Subject to any disclaimer, the term of this patent is extended or adjusted under 35 U.S.C. 154(b) by 0 days.

(21) Appl. No.: 16/199,309

(22) Filed: Nov. 26, 2018

(65) Prior Publication Data
US 2019/0160964 A1    May 30, 2019

(30) Foreign Application Priority Data
Nov. 28, 2017 (DE) .................. 10 2017 128 113

(51) Int. Cl.
*B60L 15/20* (2006.01)
*B60W 30/20* (2006.01)

(52) U.S. Cl.
CPC .......... *B60L 15/20* (2013.01); *B60L 2240/423* (2013.01); *B60L 2240/507* (2013.01); *B60W 2030/203* (2013.01); *B60W 2510/084* (2013.01); *B60W 2710/083* (2013.01); *B60W 2720/406* (2013.01)

(58) Field of Classification Search
CPC ...... B60W 10/08; B60W 10/10; B60W 20/00; B60W 20/30; B60W 30/20; B60W 2030/203; B60W 2030/206; B60W 2540/16; B60L 15/2054; B60L 15/20; Y02T 10/7275
USPC ..... 701/22, 37, 68, 51, 84; 477/70, 174, 181
See application file for complete search history.

(56) References Cited

U.S. PATENT DOCUMENTS

| | | | | |
|---|---|---|---|---|
| 5,295,921 A | * | 3/1994 | Ippolito | B60K 17/20 192/49 |
| 5,520,589 A | * | 5/1996 | Dewald | F16H 48/08 475/160 |
| 5,865,709 A | * | 2/1999 | Tamura | B60W 10/02 477/181 |

(Continued)

FOREIGN PATENT DOCUMENTS

| | | |
|---|---|---|
| DE | 102015118759 A1 | 5/2017 |
| DE | 102017100459 A1 | 7/2017 |

(Continued)

*Primary Examiner* — Cuong H Nguyen
(74) *Attorney, Agent, or Firm* — Bejin Bieneman PLC

(57) ABSTRACT

A drive system for at least one axle of a motor vehicle can be controlled, wherein the drive system has at least one electrical machine as drive unit, a drive shaft which is driven by the drive unit, a first output shaft and optionally a second output shaft and also a first clutch which connects the drive shaft to the first output shaft and optionally a second clutch which connects the drive shaft to the second output shaft, and furthermore a control unit for controlling the drive unit and the clutches, wherein the first output shaft and the optional second output shaft are arranged on a common axle.

6 Claims, 2 Drawing Sheets

(56) References Cited

U.S. PATENT DOCUMENTS

| | | | |
|---|---|---|---|
| 8,265,840 B2 * | 9/2012 | Watanabe | F16H 61/08 477/109 |
| 9,457,787 B2 * | 10/2016 | Nefcy | B60W 20/00 |
| 9,656,665 B2 * | 5/2017 | Pietron | B60W 20/40 |
| 10,106,166 B2 * | 10/2018 | Orita | B60K 6/48 |
| 10,112,617 B2 * | 10/2018 | Orita | B60W 10/08 |
| 10,253,843 B2 * | 4/2019 | Kawamura | F16F 15/13121 |
| 2001/0020789 A1 | 9/2001 | Nakashima | |
| 2002/0190683 A1 * | 12/2002 | Karikomi | G05D 19/02 318/632 |
| 2004/0261953 A1 * | 12/2004 | Hart | E04B 7/14 160/80 |
| 2005/0080523 A1 * | 4/2005 | Bennett | B60K 6/445 701/22 |
| 2006/0017414 A1 * | 1/2006 | Joe | B60K 6/445 318/432 |
| 2006/0061307 A1 * | 3/2006 | Donnelly | B60L 7/06 318/108 |
| 2007/0157899 A1 * | 7/2007 | Seufert | B60K 6/387 123/179.25 |
| 2009/0271081 A1 * | 10/2009 | Watanabe | F16H 61/08 701/60 |
| 2010/0024756 A1 * | 2/2010 | Seufert | B60K 6/387 123/179.3 |
| 2012/0265402 A1 * | 10/2012 | Post, II | B60G 17/0165 701/38 |
| 2013/0296124 A1 * | 11/2013 | Pietron | B60W 20/40 477/5 |
| 2013/0297109 A1 * | 11/2013 | Nefcy | B60W 20/00 701/22 |
| 2016/0244050 A1 * | 8/2016 | Ouchi | B60K 6/48 |
| 2018/0073593 A1 * | 3/2018 | Kawamura | F16F 15/13121 |
| 2018/0237021 A1 * | 8/2018 | Orita | B60W 10/08 |
| 2018/0237023 A1 * | 8/2018 | Orita | B60K 6/48 |
| 2019/0024732 A1 * | 1/2019 | Heubner | F16D 48/06 |

FOREIGN PATENT DOCUMENTS

| | | | | |
|---|---|---|---|---|
| EP | 2597772 A1 | | 5/2013 | |
| EP | 2839983 A1 | | 2/2015 | |
| EP | 3553021 A1 | * | 10/2019 | B66F 9/07 |
| EP | 3556723 A1 | * | 10/2019 | B66F 9/07 |
| GB | 2262818 B | * | 6/1995 | F02D 41/1497 |
| JP | 2006113272 A | * | 4/2006 | B60R 11/00 |
| JP | 2011203116 A | * | 10/2011 | G01H 3/00 |

* cited by examiner

CONTROLLING A DRIVE SYSTEM FOR AT LEAST ONE AXLE OF A MOTOR VEHICLE

CROSS-REFERENCE TO RELATED APPLICATIONS

This application claims priority to German Application No. DE 10 2017 128 113.4, filed on Nov. 28, 2017, which application is hereby incorporated herein by reference in its entirety.

BACKGROUND AND SUMMARY

The present disclosure relates to a method for controlling a drive system for at least one axle and preferably for precisely one axle of a motor vehicle. The drive system comprises at least one electrical machine as drive unit, a drive shaft which is driven by the drive unit, a first output shaft, and optionally a second output shaft, and also a first clutch which connects the drive shaft to the first output shaft and optionally a second clutch which connects the drive shaft to the second output shaft. A control unit for controlling the drive unit and the clutch (clutches) is further provided. The clutches are associated with the output shafts of different axles or preferably a common axle.

Drive systems of this kind are provided, for example, for passing on and, in accordance with demand, splitting a torque which is provided by the drive unit.

There is a constant need to control drive systems as far as possible such that rapid adjustment to varying driving situations and changing operating points is rendered possible. In the process, vibratory excitation in the drive system should be taken into account. Furthermore, thermal or mechanical overloading of the components of the drive system and a resulting possibly premature failure of the components should be avoided.

Taking this as a starting point, the present disclosure addresses the above disadvantages and problems, in particular, proposes a method for controlling a drive system (during operation of a motor vehicle) which is suitable for this purpose. In particular, the method should allow components of the drive system to be protected against overloading, wherein transmission and splitting of a drive torque, which is desired by a driver of the motor vehicle for example, by means of the clutches to the wheels of at least one axle is rendered possible as rapidly and precisely as possible in this case.

The features specified individually in the patent claims can be combined with one another in any desired technologically meaningful way and can be supplemented by explanatory facts from the description and details from the figures, with further design variants of the invention being highlighted.

The disclosure proposes a (first) method for controlling a drive system for at least one axle of a motor vehicle. The drive system has at least one electrical machine as drive unit (optionally additionally a further drive unit, for example an internal combustion engine), a drive shaft which is driven by the drive unit, a first output shaft and also a first clutch which connects the drive shaft to the first output shaft, and a control unit. The method comprises at least the following steps:
a) determining a change which is desired (for example by a driver) in a drive torque which is provided at least by the electrical machine;
b) checking vibratory excitation to be expected or possible vibratory excitation in the event of a change in the drive torque;
c) calculating an adjustment factor for the change in the drive torque to be introduced; and
d) introducing the drive torque, which is changed by the adjustment factor, starting at least from the drive unit (at least) into the drive shaft.

The above (non-limiting) subdivision of the method steps into a) to d) is intended to serve for descriptive purposes and not to dictate any order and/or dependence. The frequency of the method steps, for example during the setting-up and/or the operation of the drive system, can also vary. Similarly, it is possible for method steps to at least partially overlap in respect of time and/or for individual method steps or several method steps to be repeated.

The method is directed, in particular, at reducing and/or compensating for vibratory excitation phenomena which occur in a drive train of an at least electrically driven motor vehicle.

Vibratory excitation phenomena are caused, for example, by external disturbances (for example by an unbalance when driving over a bump) or by dynamic load changes in the drive unit. Rotational vibration in the drive train can, in particular, escalate to such an extent that it results in disconnection of the electrical drive train. In addition, very high mechanical forces which may exceed the limit values intended for the loading take effect in the event of vibration.

Vibratory excitation phenomena are caused, for example, by the play in the gearbox or in joints of the side shafts of an axle of a motor vehicle. In the event of a load change in the drive unit, this play first has to be overcome so that the drive torque can be transmitted by means of all components. While the play is being overcome, no torque can be transmitted and therefore the vibration form of the vibration in the drive train changes. This non-linear effect does not generate any opposing torque for the drive unit while the play is being overcome and, in the event of the opposing torque suddenly coming into effect (when the play has been overcome), can cause a disturbance, in the control of an electrical machine by the control unit. This can result in unstable behaviour of the control loop and noise problems in the form of load change clatter can occur.

A further reason for vibrations in the drive train can be low stiffnesses of the side shafts in combination with highly dynamic loading by an electrical drive machine.

Specifically in the case of drive systems which have an electrical machine as drive unit and two clutches for one axle (so-called twinster systems in which the clutches replace a differential which is usually provided), it has been observed that vibrations can be generated and amplified in a particularly pronounced manner. Owing to the high dynamics of an electrical machine (that is to say the high speeds at which drive torques can be changed) and the torque transmission of the clutches which is delayed in comparison, the electrical machine can accelerate in an undesired manner, as a result of which a slip is created in the clutches. When the clutches then achieve the drive torque to be transmitted, the electrical machine has to be braked again. This creates unsteady torque transmission which can lead to vibratory excitation in the drive train.

The resulting severe mechanical loading of the components of a drive system, for example gearbox, bearings, shafts, joints, clutches, lead to accelerated ageing and can even cause sudden failure of the components. Furthermore, the vibrations, which occur, in the drive train lead to jerking of the motor vehicle, for example when starting-up, and this can be felt by the driver and/or occupants of a motor vehicle and can be perceived as highly disruptive.

Protecting structural parts or components on the one hand and the comfort of the user of the motor vehicle on the other hand require an adequately damped drive system, so that maximum driving dynamics can be achieved together with stable driving behaviour.

The method is directed, in particular, at achieving the best-possible acceleration of the motor vehicle and at the same time a high degree of travelling comfort. To this end, the drive torque of the electrical machine, which drive torque changes (abruptly) as a result of a driver request for example, is not introduced into the drive train, but rather initially processed in the control unit.

In the control unit, a check is made to determine whether the desired change in the drive torque can lead to vibratory excitation (step b), in particular at least the above-described vibratory excitation of which the cause lies, for example, in the operation of the vehicle or of the drive system or can be (directly) related thereto.

An adjustment factor by way of which the expected vibratory excitation or the influence thereof on the drive system or the driving operation can be prevented or at least reduced is calculated as part of step c).

A drive torque, which is changed by the adjustment factor, is generated by the electrical machine and introduced into the drive train or the drive system, starting from the electrical machine, only as part of the subsequent or following step d).

The adjustment factor takes into account, in particular, different operating points (depending, for example, on the driving situation, that is to say start-up, coasting, acceleration, deceleration etc., and also on rotation speed, drive torque, etc.) and the properties of the drive train (play of the individual components, damping, elastic deformability, control behaviour of components, for example of clutches, feedback to the control arrangement of the electrical machine which is caused by the instances of mechanical play, stiffness of the shafts, mass of the motor vehicle, transmission ratios of a gearbox, moments of mass inertia of the components of the drive system).

In particular, the drive torque of the electrical drive machine is controlled at time intervals of 0.5 to 5 milliseconds depending on the driver request. As part of the method for influencing the vibratory excitation, in particular as part of steps b), c) and d), the drive torque is controlled, in particular, at time intervals of 50 to 250 microseconds. Therefore, an influence can be exerted on the drive system and therefore the vibratory excitation phenomena and instances of play can be compensated for in a targeted and highly dynamic manner by controlling the drive torque of the electrical machine.

The control method relates, in particular, to controlling one or more clutches of the drive system, so that the clutches can be operated at prespecified time points or even at any time by a contact-pressure force and therefore a torque which is provided by the drive unit can be transmitted in a desired manner to at least one wheel of at least one, preferably common, axle of the motor vehicle.

In particular, the drive system comprises a second output shaft and a second clutch which connects the drive shaft to the second output shaft, wherein the first output shaft and the second output shaft are arranged on a common axle.

In particular, the method is provided for controlling a drive system in which two clutches are provided on a common axle of the motor vehicle, wherein in each case one wheel of the motor vehicle is connected in a torque-transmitting manner to the drive unit of the motor vehicle by means of each of the two clutches. The two clutches can replace the differential which is otherwise customary, and by way of which the different rotation speeds of the wheels can be compensated for. The clutches can be, for example, hydraulically or electromechanically operable clutches.

The design of clutches and drive systems of this kind can be described as follows: The clutches used can be, for example, multi-plate clutches in which outer plates are connected in a rotationally fixed manner to an external plate carrier and inner plates are connected in a rotationally fixed manner to an internal plate carrier (or vice versa) and each plate carrier is connected in a rotationally fixed manner to the drive shaft or the respective output shaft. As a result of application of a contact-pressure force (as a result of the operating pressure) which acts in an axial direction, the plates, in the case of other clutches the friction partners or precisely those partners respectively for generating a frictional connection between torque-transmitting parts of the respective clutch, are brought into contact with one another, so that a torque can be transmitted from the drive shaft, via the clutch, to the respective output shaft.

Specifically in the case of drive systems with an electrical machine as drive unit, it may be the case (for example at low rotation speeds and possibly a simultaneously high provided drive torque and/or in the event of highly dynamic changes in the drive torque which is provided by the drive unit) that a drive torque which is provided by the drive unit is at least temporarily greater than a torque which can be transmitted as a maximum by the clutches (at an existing operating point) possibly in total (that is to say sum, for example, of torques which can be transmitted via two clutches). In this driving situation or at this operating point, that is to say when the drive torque which is provided by the at least one drive unit is greater than the torque which can be transmitted by means of the at least one clutch, the electrical machine or the drive shaft accelerates more rapidly than the motor vehicle or the at least one output shaft. This creates slip on at least one clutch, which slip leads to high frictional power in the clutches (at least one clutch). The resulting thermal loading can destroy or at least damage a clutch. Furthermore, the efficiency of the drive system is reduced and the $CO_2$ balance is adversely affected in this way.

In principle, a small slip (a so-called microslip) can be entirely permissible and also intended. This is permitted, in particular, because it is possible to determine in this way that a drive torque which is desired, for example, by the driver or which is provided by the drive unit can be transmitted via the clutches with the intended distribution (that is to say predetermined proportions of the torque to each wheel of the motor vehicle). However, the thermal loading by the microslip does not lead to impermissible thermal loading of the clutches.

Operating points of this kind are present, for example, when the motor vehicle is driving around a bend and the wheels of a common axle should be at different speeds. Here, a torque which is transmitted via the clutch on the inside of the bend is reduced in order to improve a yaw behaviour of the motor vehicle.

In particular, a transmission behaviour of the two clutches in respect of the splitting and transmission of the drive torque to the output shafts is taken into account in the method.

A limit value for a maximum permissible slip is preferably defined for the two clutches in each case, wherein the adjustment factor and/or an opposing vibration are/is selected such that the limit value is permanently undershot.

Owing to the proposed method, a drive torque which can be provided by the drive unit for driving the first output shaft and the second output shaft can be limited depending on a sum of the torques which can be transmitted as a maximum via the clutches at an operating point. In particular, the drive torque which is provided by the drive unit can correspond at most to the sum of the torques which can be transmitted as a maximum. A higher drive torque would not accelerate the motor vehicle, but rather only increase the slip in at least one of the clutches—this is reduced or even avoided here.

The method, and in particular only step a), is carried out, in particular, at specific operating points of the drive unit or in the event of specific driving situations and changes in the drive torque which occur in the process.

A further aspect proposes a (second) method for controlling a drive system for at least one axle of a motor vehicle. The drive system comprises at least one electrical machine as drive unit (optionally additionally a further drive unit, for example an internal combustion engine), a drive shaft which is driven by the drive unit, a first output shaft and a second output shaft, and also a first clutch which connects the drive shaft to the first output shaft and a second clutch which connects the drive shaft to the second output shaft, and furthermore a control unit for controlling the drive unit and the clutches. The first output shaft and the second output shaft are arranged on a common axle. The method comprises at least the following steps:
1) determining a desired change in a drive torque which is provided at least by the electrical machine;
2) checking vibratory excitation which is established owing to the change in the drive torque which has already taken place;
3) calculating an opposing vibration for influencing the provided drive torque; and
4) introducing the opposing vibration;
wherein a transmission behaviour of the two clutches in respect of the splitting and transmission of the drive torque to the output shafts is taken into account.

Reference is made to the statements relating to the (first) method, so that these explanations can also be used for characterizing the (second) method, and vice versa. The two methods can also be carried out in combination, for example one after the other.

In a departure from the (first) method, the drive system comprises a second output shaft and a second clutch here. Furthermore, the vibratory excitation which is established as a result of the change in the drive torque is detected and checked only after it occurs and an opposing vibration is then introduced in accordance with step 3).

The opposing vibration is generated, in particular, by actuating the electrical machine, in particular by controlling the drive torque.

In particular, the drive torque of the electrical drive machine is controlled at time intervals of 0.5 to 5 milliseconds [ms] depending on the driver request. As part of the method for influencing the vibratory excitation in accordance with steps 2), 3) and 4), the drive torque is controlled, in particular, at time intervals of 50 to 250 microseconds [μs]. Therefore, an influence can be exerted on the drive system and therefore the vibratory excitation phenomena and instances of play can be compensated for in a targeted and highly dynamic manner by controlling the drive torque of the electrical machine.

System damping of the drive system can be considerably increased by way of the vibratory excitation which is established as a result of a change which is desired (for example by the driver) in the drive torque which is provided at least by the electrical machine being checked by the control unit, and by way of the drive torque, which is to be introduced, being adjusted by the ascertained adjustment factor in a manner derived from the checking, and by way of an opposing vibration being introduced. An increase in the system damping can reduce or even compensate for vibrations which correspondingly occur.

Furthermore, the drive torque which is introduced into the drive shaft can be changed by the adjustment factor or the opposing vibration such that a limit value, which is defined for the clutches, in respect of the maximum permissible slip is permanently undershot.

The disclosure further proposes a motor vehicle, at least having a drive system for at least one axle of the motor vehicle, wherein the drive system has at least one electrical machine as drive unit, a drive shaft which is driven by the drive unit, a first output shaft and also a first clutch which connects the drive shaft to the first output shaft, optionally additionally a second output shaft and also a second clutch which connects the drive shaft to the second output shaft, and furthermore a control unit for controlling the drive unit and the clutch. The control unit is suitable and/or designed for carrying out the (first and second) methods. In particular, the methods can be carried out using the control unit.

In particular, in each case one wheel of a common axle of the motor vehicle can be connected in a torque-transmitting manner to the drive unit by way of operating the first clutch and the second clutch.

In particular, a gearbox with a variable transmission ratio is arranged between the drive unit and the output shafts. Variable transmission ratio means, in particular, that there is not a single constant transmission ratio, but rather that the transmission ratio can be changed, for example in steps or else continuously.

As an alternative, there can be no gearbox or a gearbox with a single fixed transmission ratio arranged between the drive unit and the output shafts.

At least one of the two clutches can be a hydraulically operated clutch, preferably both clutches being hydraulically operated clutches. In the case of a hydraulically operated clutch, the contact pressure is transmitted to the clutch via a hydraulic fluid. The hydraulic fluid can be pressurized by means of a (likewise electrically operable) pump.

At least one of the two clutches can be an electrically or electromechanically operated clutch, preferably both clutches being electrically or electromechanically operated clutches. In the case of an electrically operated clutch, the contact pressure is generated directly by a further electrical machine, for example by a ramp arrangement which can be rotated by means of the machine.

In particular, in each case one wheel of the common axle of the motor vehicle can be connected in a torque-transmitting manner to the drive unit as a result of operating each of the clutches.

At least one clutch is, in particular both clutches are, a multiplate clutch.

The statements relating to the method apply, in particular, to the motor vehicle too, and vice versa.

In particular, the two clutches for transmitting torques are arranged on one axle of a motor vehicle, so that a first wheel of one axle is connected in a torque-transmitting manner to the drive unit by operating the first clutch and a second wheel of the same axle of the motor vehicle is connected in a torque-transmitting manner to the drive unit by operating the second clutch. Therefore, in particular, the clutches are not clutches of a motor vehicle which are arranged between the drive unit and a shiftable gearbox of the motor vehicle.

Clutches of this kind which are jointly arranged on one axle (often) have to process sudden changes in a first torque and pass on this torque to the wheels in a predetermined manner.

The method proposed here can be realized by a method which is executed on a computer and comprises, in part or in full, the steps outlined here.

Furthermore, the disclosure proposes a data-processing system which comprises a computing unit or a processor which is adjusted and/or configured such that it executes, in part or in full, the steps outlined here.

The computer, the computing unit and/or the processor can be part of the control unit, in particular the superordinate control unit of the vehicle, and/or can be connected in a data-conducting manner to this control unit.

The disclosure also proposes a computer program or a computer program product comprising commands which, in the event of the program being executed by a computer, prompt the computer to execute, in part or in full, the steps outlined here.

The disclosure also proposes a computer-readable storage medium comprising commands which, in the event of execution by a computer, prompt the computer to execute, in part or in full, the steps outlined here.

By way of precaution, it should be noted that the numerals ("first", "second", . . . ) used here serve primarily (only) to distinguish between multiple objects, values or processes of the same type, that is to say do not in particular necessarily prespecify a dependence and/or order of these objects, values or processes in relation to one another. If a dependence and/or order is necessary, this is specified explicitly here or becomes clearly apparent to a person skilled in the art on examination of the specifically described refinement.

SUMMARY OF THE DRAWINGS

The invention as well as the technical field are explained in more detail below with reference to the figures. It should be noted that the invention is not intended to be restricted by the exemplary embodiments shown. In particular, unless not explicitly stated otherwise, it is also possible to extract partial aspects of the substantive matter explained in the figures and combine it with other constituent parts and findings from the present description and/or figures. Identical reference symbols denote identical objects, with the result that, where appropriate, explanations from other figures can be used in a supplementary fashion. In the drawings, in each case schematically.

DESCRIPTION

Figure 1:
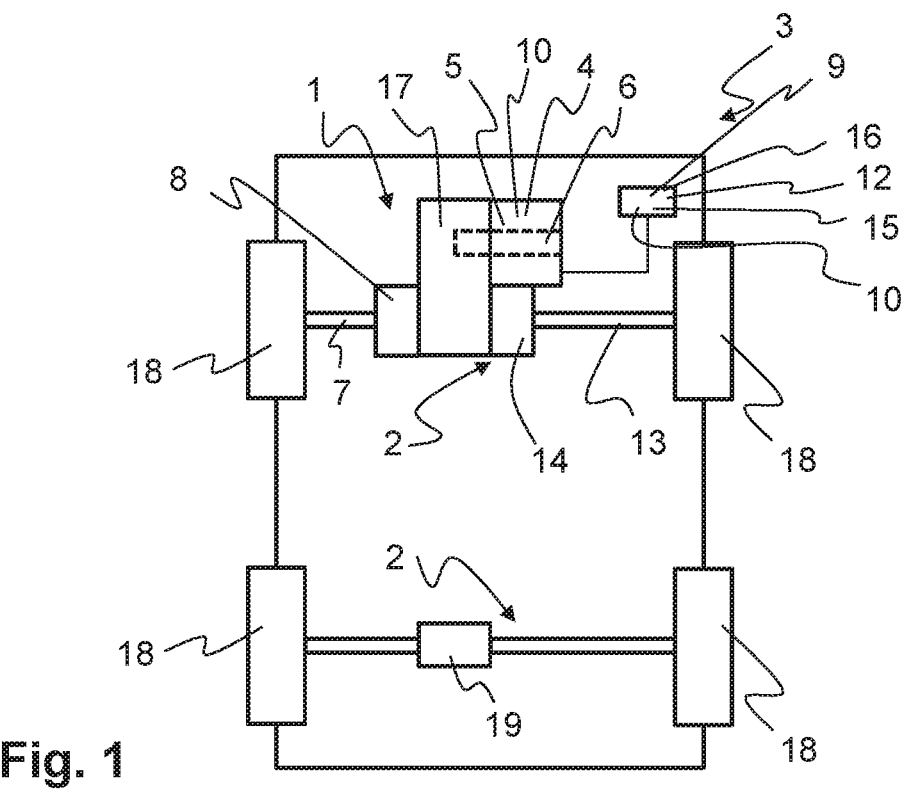
FIG. 1: shows a motor vehicle comprising a drive system for driving in each case one wheel of the motor vehicle.

FIG. 1 shows a motor vehicle 3 comprising a drive system 1 for driving two wheels 18 of a common axle 2 of the motor vehicle 3. The drive system 1 comprises an electrical machine 4 as drive unit 5, a drive shaft 6 which is driven by the drive unit 5, a first output shaft 7 and a second output shaft 13, and also a first clutch 8 which connects the drive shaft 6 to the first output shaft 7 and a second clutch 14 which connects the drive shaft 6 to the second output shaft 13. A control unit 9 for controlling the drive unit 5 and the two clutches 8, 13 is further provided.

The figure shows a drive system 1 in which two clutches 8, 14 are provided on a common axle 2 of the motor vehicle 3, wherein in each case one wheel 18 of the motor vehicle 3 is connected in a torque-transmitting manner to the drive unit 5 of the motor vehicle 3 by means of each of the two clutches 8, 14. The two clutches 8, 14 replace a differential 19 which is otherwise customary (shown on the other axle 2 of the motor vehicle 3 here) and by way of which the different rotation speeds of the wheels arranged there can be compensated for.

A gearbox 17 with a variable transmission ratio is arranged between the drive unit 5 and the output shafts 7, 13.

The objective of the proposed method is firstly to change a drive torque 10, which can be provided by the drive unit 5 for driving the first output shaft 7 and the second output shaft 13, by an adjustment factor 12 before introducing the drive torque 10 into the drive shaft 6 and secondly to generate an opposing vibration 16 by way of changing the drive torque 10.

By means of the (first) method, it is determined in step a) that a change which is desired (for example by a driver) in a drive torque 10 which is provided by the electrical machine 4 is present. In step b), a check is made to determine whether possible vibratory excitation 11 takes place in the event of a change in the drive torque 10. In step c), an adjustment factor 12 for changing the drive torque 10 which is to be introduced is calculated. In step d), the drive torque 10, which is changed by the adjustment factor 12, is introduced starting from the drive unit 5 into the drive shaft 6.

By means of the (second) method, it is determined in step 1) that a change which is desired (for example by a driver) in a drive torque 10 which is provided by the electrical machine 4 is present. In step 2), a check is made to determine whether vibratory excitation 11 is established in the drive system 1 owing to the change in the drive torque 10 which has already taken place. In step 3), an opposing vibration 16 for influencing the provided drive torque 10 is calculated, and in step 4) the opposing vibration is introduced into the drive shaft 6 by changing the drive torque 10.

A limit value 15 for a maximum permissible slip is defined for the two clutches 8, 14 in each case and stored in the control unit 9, wherein the adjustment factor 12 and also the opposing vibration 16 are selected such that the limit value is permanently undershot.

Figure 2:
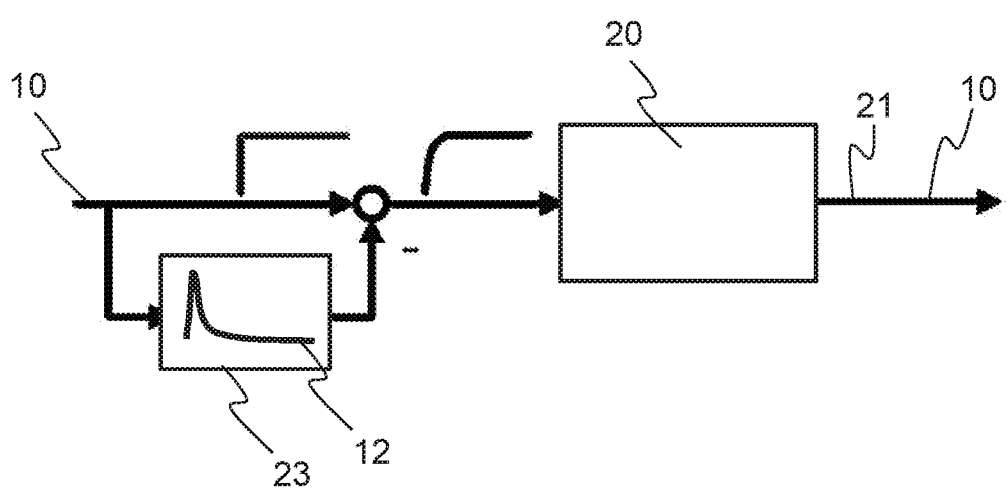
FIG. 2: shows a sequence of the first method.

FIG. 2 shows a sequence of the first method. Reference is made to the statements relating to FIG. 1.

This so-called "passive approach" shown here is based on an open control loop. Here, the request for the drive torque 10 is adjusted, so that the drive system 1 is not excited to vibrate at all. For this reason, knowledge or checking of physical state variables of the drive system 1 is not necessary in particular. The adjustment of the drive torque 10 by means of the controller 23 and by the adjustment factor 12 is based on a reduction in the time response of the drive system 1 (see indicated control behaviour). In order to be able to achieve effective vibration reduction, the adjustment factor 12 has to be applicable to the respective vehicle. Since the vibration-related driving states change, the passive approach includes identification of these states. If the driving state changes (start-up on an incline, trailer coupled, etc.), the respective application variables are adjusted and the corresponding adjustment factor 12 is selected. The drive torque 10 which is changed by the adjustment factor 12 is converted by means of a module 20 into physical signals 21 for actuating the electrical machine 4.

Figure 3:
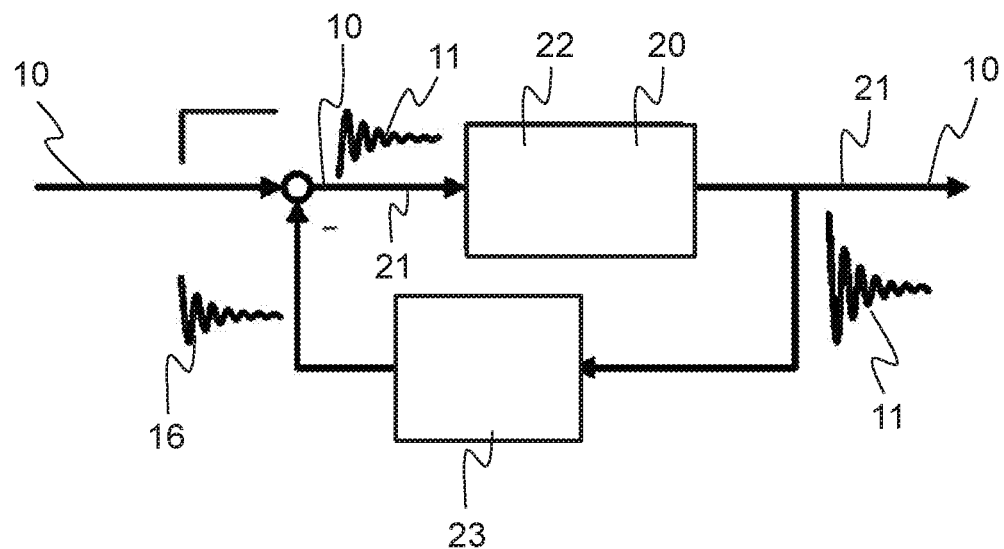
FIG. 3: shows a sequence of the second method.

FIG. 3 shows a sequence of the second method. This "active approach" is based on a closed control loop. Using a stored mathematical model in the module 20 and with the aid of the existing measured signals 21, the vibration components in the drive torque 10 are determined by way of additional estimated physical state variables 22 and an opposing vibration 16 is actively calculated by way of the controller 23. This opposing vibration 16 is offset against the requested (desired) drive torque 10 and passed to the torque control arrangement as setpoint value. Different models, which each require different measurement signals, are available for estimating the physical state variables 22. The input variables used are, for example, the wheel rotation speeds, the vehicle speed, the rotation speed of the electrical machine 4 or the estimated drive torque of the electrical machine 4. Combinations of these input variables are likewise possible.

The drive torque 10 which is changed by the opposing vibration 16 is converted by means of the module 20 into physical signals 21 for actuating the electrical machine 4.

LIST OF REFERENCE SYMBOLS

1 Drive system
2 Axle
3 Motor vehicle
4 Machine
5 Drive unit
6 Drive shaft
7 First output shaft
8 First clutch
9 Control unit
10 Drive torque
11 Vibratory excitation
12 Adjustment factor
13 Second output shaft
14 Second clutch
15 Limit value
16 Opposing vibration
17 Gearbox
18 Wheel
19 Differential
20 Module
21 Signal
22 State variable
23 Controller

The invention claimed is:

1. Method for controlling a drive system for at least one axle of a motor vehicle, wherein the drive system has at least one electrical machine as drive unit, a drive shaft which is driven by the drive unit, a first output shaft and also a first clutch which connects the drive shaft to the first output shaft, and a control unit, wherein the method comprises at least the following steps:
   a) determining a desired change in a drive torque which is provided at least by the electrical machine;
   b) predicting vibratory excitation resulting from a change in the drive torque;
   c) adjusting the drive torque to be introduced based on a reduction in a time response of the drive system and the predicted vibratory excitation;
   d) introducing the adjusted drive torque starting at least from the drive unit into the drive shaft.

2. The method of claim 1, wherein the drive system comprises a second output shaft and a second clutch which connects the drive shaft to the second output shaft, wherein the first output shaft and the second output shaft are arranged on a common axle connecting two wheels.

3. The method of claim 2, wherein a transmission behavior of the two clutches in respect of the splitting and transmission of the drive torque to the output shafts is taken into account.

4. The method of claim 3, wherein a limit value for a maximum permissible slip is defined for the two clutches in each case; wherein the adjustment factor is selected such that the limit value is permanently undershot.

5. Method for controlling a drive system for at least one axle of a motor vehicle, wherein the drive system has at least one electrical machine as drive unit, a drive shaft which is driven by the drive unit, a first output shaft and a second output shaft and also a first clutch which connects the drive shaft to the first output shaft and a second clutch which connects the drive shaft to the second output shaft, and furthermore a control unit for controlling the drive unit and the clutches, wherein the first output shaft and the second output shaft are arranged on a common axle, wherein the method comprises at least the following steps:
   1) determining a desired change in a drive torque which is provided at least by the electrical machine;
   2) detecting vibratory excitation resulting from the change in the drive torque which has already taken place;
   3) calculating an opposing vibration for influencing the provided drive torque;
   4) introducing the opposing vibration;
   wherein a transmission behavior of the two clutches in respect of the splitting and transmission of the drive torque to the output shafts is taken into account.

6. A motor vehicle, at least having a drive system for at least one axle of the motor vehicle, wherein the drive system has at least one electrical machine as drive unit, a drive shaft which is driven by the drive unit, a first output shaft and also a first clutch which connects the drive shaft to the first output shaft, and furthermore a control unit for controlling the drive unit and at least the first clutch, wherein the control unit is configured to carry out a first method or a second method, the first method comprising:
   a) determining a desired change in a drive torque which is provided at least by the electrical machine;
   b) predicting vibratory excitation resulting from a change in the drive torque;
   c) adjusting the drive torque to be introduced based on a reduction in a time response of the drive system and the predicted vibratory excitation; and
   d) introducing the drive torque, which is changed by the adjustment factor, starting at least from the drive unit into the drive shaft;
the second method comprising:
   1) determining a desired change in a drive torque which is provided at least by the electrical machine;
   2) detecting vibratory excitation resulting from the change in the drive torque which has already taken place;
   3) calculating an opposing vibration for influencing the provided drive torque;
   4) introducing the opposing vibration;
   wherein a transmission behavior of the two clutches in respect of the splitting and transmission of the drive torque to the output shafts is taken into account.

* * * * *